United States Patent
Kennedy et al.

(10) Patent No.: US 9,762,593 B1
(45) Date of Patent: Sep. 12, 2017

(54) AUTOMATIC GENERATION OF GENERIC FILE SIGNATURES

(71) Applicant: Symantec Corporation, Mountain View, CA (US)

(72) Inventors: Mark Kennedy, Gardena, CA (US); Kenneth Coleman, Knoxville, TN (US)

(73) Assignee: Symantec Corporation, Mountain View, CA (US)

( * ) Notice: Subject to any disclaimer, the term of this patent is extended or adjusted under 35 U.S.C. 154(b) by 174 days.

(21) Appl. No.: 14/481,763

(22) Filed: Sep. 9, 2014

(51) Int. Cl.
*H04L 29/06* (2006.01)

(52) U.S. Cl.
CPC ........ *H04L 63/1416* (2013.01); *H04L 63/145* (2013.01); *H04L 63/164* (2013.01)

(58) Field of Classification Search
CPC . H04L 63/1416; H04L 63/145; H04L 63/164; H04L 63/1433; H04L 63/14; H04L 63/1408; G06F 21/561; G06F 21/562; G06F 21/564; G06F 21/56; G06F 21/566
USPC .................................................... 726/22–25
See application file for complete search history.

(56) References Cited

U.S. PATENT DOCUMENTS

| | | | |
|---|---|---|---|
| 8,181,251 B2 | 5/2012 | Kennedy | |
| 8,280,830 B2 | 10/2012 | Kennedy | |
| 8,464,345 B2 | 6/2013 | Satish et al. | |
| 8,635,171 B1 | 1/2014 | Kennedy | |
| 2010/0083376 A1 | 4/2010 | Pereira et al. | |
| 2010/0162395 A1 | 6/2010 | Kennedy | |
| 2011/0055123 A1 | 3/2011 | Kennedy | |
| 2011/0271341 A1* | 11/2011 | Satish | G06F 21/552 726/23 |
| 2011/0283361 A1* | 11/2011 | Perdisci | G06F 21/56 726/24 |
| 2014/0201208 A1 | 7/2014 | Satish et al. | |
| 2015/0172303 A1* | 6/2015 | Humble | H04L 63/1408 726/23 |

OTHER PUBLICATIONS

Dhilung Kirat, Giovanni Vigna, Lakshmanan Nataraj and B.S. Manjunath, "SigMal : A Static Processing Based Malware Triage", ACSAC '13—Proceedings of the 29th Annual Computer Security Applications Conference, Dec. 9-13, 2013, pp. 89-98.*
Zami Aung & Win Zaw, "Permission-Based Android Malware Detection", International Journal of Scientific & Technology Research, vol. 2 Issue 3, Mar. 2013, pp. 228-234.*
Rieck et al., Automatic Analysis of Malware Behavior using Machine Learning, Journal of Computer Security (2011), 1-30.
Gandotra, et al., Malware Analysis and Classification: A Survey, (2014), Journal of Information Security, 5, 56-64.
Morovati, Malware Detection Through Decision Tree Classifier, (2013), CSEE, 190-196.

(Continued)

*Primary Examiner* — Joseph P Hirl
*Assistant Examiner* — Chi Nguy
(74) *Attorney, Agent, or Firm* — FisherBroyles LLP

(57) ABSTRACT

Systems and methods to automatically generate signatures used to detect malware are provided. The systems and methods use machine learning techniques, to build an overtrained heuristic model to analyze software, cluster identified patterns, validate the clusters against known reputational metrics, automatically create signatures and, in some examples, deploy such signatures to remote computing devices.

20 Claims, 5 Drawing Sheets

(56) References Cited

OTHER PUBLICATIONS

Sourabh Satish; Systems and Methods for Updating Generic File-Classification Definitions; U.S. Appl. No. 14/210,364, filed Mar. 13, 2014.

Petrus Johannes Viljoen, et al; Systems and Methods for Improving the Classification Accuracy of Trustworthiness Classifiers; U.S. Appl. No. 14/836,991, filed Aug. 27, 2015.

Ajitesh Roychowdhury, et al; Systems and Methods for Automated Generation of Generic Signatures Used to Detect Polymorphic Malware; U.S. Appl. No. 15/041,043, filed Feb. 11, 2016.

Wicherski, Georg "peHash: A Novel Approach to Fast Malware Clustering", https://www.usenix.org/legacy/event/leet09/tech/full_papers/wicherski/wicherski.pdf, as accessed Nov. 17, 2015, (2009).

Newsome, James et al., "Polygraph: Automatically Generating Signatures for Polymorphic Worms", http://repository.cmu.edu/cgi/viewcontent.cgi?article=1028&context=ece, as accessed Nov. 17, 2015, (2005).

Rouse, Margaret "polymorphic malware", http://searchsecurity.techtarget.com/definition/polymorphic-malware, as accessed Nov. 17, 2015, (Apr. 19, 2007).

* cited by examiner

AUTOMATIC GENERATION OF GENERIC FILE SIGNATURES

BACKGROUND

Field

The present disclosure generally relates to computer security, and in particular to generating generic file signatures for detecting malicious software.

Description of the Related Art

Malicious software, sometimes called "malware," is generally defined as software that executes on a computing system surreptitiously, or that has some surreptitious functionality. Malware can take many forms, such as parasitic viruses that attach to legitimate files, worms that exploit weaknesses in the computer's security in order to infect the computer and spread to other computers, Trojan horse programs that appear legitimate, but actually contain hidden malicious code, and spyware that monitors keystrokes and/or other actions on the computer in order to capture sensitive information or display advertisements. A wide variety of malicious software (malware) can attack modem computers. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations.

Conventional techniques for detecting malware, such as signature string scanning, are part of an overall computer security protection regime, but less effective against today's malware. Modern malware is often targeted and delivered to only a relative handful of computers. For example, a Trojan horse program can be designed to target computers in a particular department of a particular enterprise. Such malware might never be encountered by security analysts, and thus the security software might never be configured with signatures for detecting such malware. Mass-distributed malware, in turn, can contain polymorphisms that make every instance of the malicious software unique. As a result, it is difficult to develop signature strings that reliably detect all instances of the malware.

Newer techniques for detecting malware apply rules that make an inference about whether a target computer file is malicious by examining dynamic attributes of the target file, code or software. This type of malware detection uses a set of heuristics to make the inference based off dynamic file attributes and then generate signatures (sometimes called behavioral signatures) to identify malware. It should be noted that the terms "heuristic" or "heuristic algorithm" as used herein, generally refer to any type or form of algorithm, formula, model, or tool that may be used to classify or make decisions with respect to an object or sample.

The signatures are typically derived from decision trees developed using decision tree induction algorithms. Decision trees and other heuristics may be trained and refined using a corpus of known samples. As an example for detecting malware, a security-software vendor may train a malware detection heuristic by applying the heuristic to a corpus of samples containing known-malicious files and known-legitimate files. Known-legitimate files refer to software known to be non-malicious, and are sometimes referred to as "goodware." Goodware can include common and/or popular software programs that are frequently present on a computer system.

The accuracy of a heuristic is often limited by the size of the corpus of samples used to train the heuristic. As such, heuristics may generate false negatives and/or false positives upon being deployed and used in the real world. The term "false positive" may represent an error made in rejecting a null hypothesis when the null hypothesis is actually true. For example, a malware-detection heuristic may produce a false positive by incorrectly determining that a legitimate file or software application is malicious. In order to improve the accuracy of a heuristic, heuristic providers typically: 1) add misclassified samples gathered from the field to the corpus of samples used to train the heuristic, 2) re-train the heuristic using the modified corpus of samples, and then 3) redeploy the re-trained heuristic. However, even if a heuristic is re-trained using a corpus of samples that includes misclassified samples gathered from the field, re-trained heuristics may produce new false positives upon being redeployed in the field. Because of this, heuristic providers may have to constantly redeploy and retest a heuristic until satisfactory performance is obtained.

SUMMARY

The present disclosure provides a method, computer system, and computer-readable storage medium for generating signatures for detecting malware. In one embodiment, the method includes collecting a set of static attributes from a malware dataset and a goodware dataset, and generating one or more trained or over-trained decision trees from the set of attributes. The amount of overtraining effects the overall specificity and accuracy of the resulting signatures. Once the one or more decision trees are generated, data from a collection of known goodware and unknown files is processed through the one or more decision trees to identify patterns and form one or more clusters. Each of the one or more clusters is validated against a reputation value range to determine if each of the one or more clusters is a bad cluster or a suspected bad cluster, and generating a signature associated with each bad cluster and each suspected bad cluster. The method may also include a step of deploying each signature to one or more remote computing systems.

The present disclosure also provides a system to automatically generate signatures used to detect malware. In one embodiment the system includes an attribute collection module, a heuristic module, a clustering module, a cluster validation module, and a signature generation module. The attribute collection module is used to collect a set of static attributes from a malware dataset and a goodware dataset. The heuristic module is used to build one or more trained or over-trained decision trees from the set of static attributes. The amount of overtraining effects the overall specificity and accuracy of the resulting signatures. The clustering module runs data from an unknown file dataset and a goodware dataset through the one or more decision trees to identify patterns and form one or more clusters. The cluster validation module compares each of the one or more cluster against a reputation value range to determine if each of the one or more clusters is a bad cluster or suspected bad cluster, and the signature creation module creates a signature associated with each bad cluster and each suspected bad cluster. The system may also include a deployment module used to deploy each signature to one or more remote computing systems.

BRIEF DESCRIPTION OF THE DRAWINGS

The figures depict embodiments for purposes of illustration only. One skilled in the art will readily recognize from the following description that alternative embodiments of the structures and methods illustrated herein may be employed without departing from the principles described herein.

DETAILED DESCRIPTION

Figure 1:
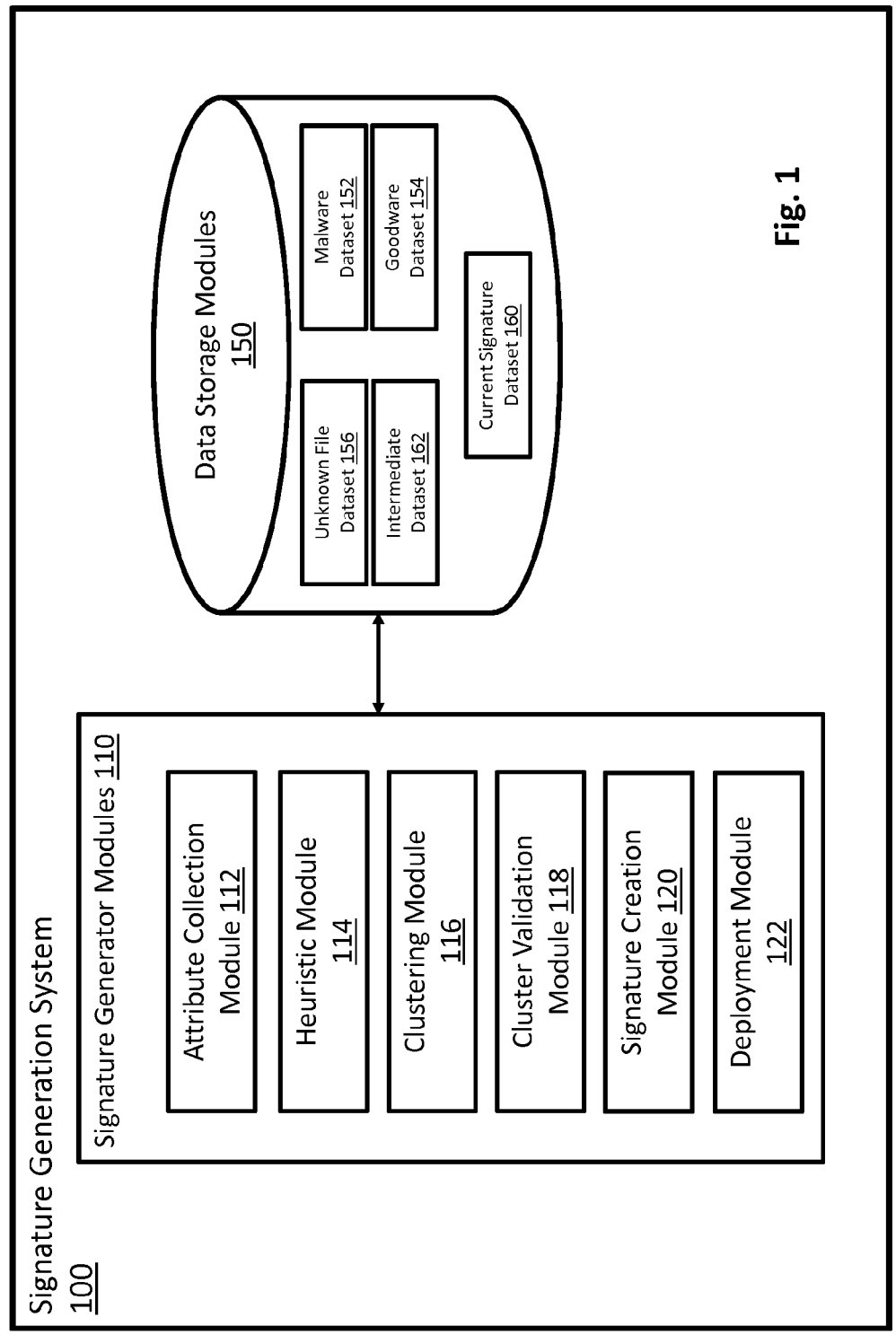
FIG. 1 is a block diagram of a signature generation system according to one embodiment of the present application.

Referring now to the figures, FIG. 1 is a block diagram of an exemplary signature generation system 100 for automatically generating signatures based off of static file attributes for detecting malware, while reducing the false positive incident rate. The signature generation system 100 according to the present application may include one or more signature generator modules 110 for automatically generating and deploying malware signatures, and data storage modules 150. A module can be implemented in hardware, firmware, and/or software.

The signature generator modules are preferably stored on a computer-readable storage medium, loaded into system memory, and executed by a system processor. Security server 300, seen in FIG. 2, may be used to execute one or more of the signature generator modules. The data storage modules 150 store data used by the signature generator modules 110 to create unique signatures for detecting malware. Examples of such data include malware data set 152, goodware data set 154, unknown file data set 156, current signature dataset 160 and intermediate data 162. The data storage modules 150 may be implemented in a relational database or another type of database.

The malware dataset 152 and goodware dataset 154 contain files, code or software (collectively referred to as "software") that are known to be malware or goodware, respectively. The malware dataset 152 and goodware dataset 154 are continuously updated, but due to the volume of malware generated and detected each day, the historical malware dataset is typically not maintained on a same day-basis. The unknown file dataset 156 contains software recently collected from the field the status of which is not known such that it may be or contain malware or goodware. New goodware is added to the goodware dataset 154. Unknown files are typically collected by security vendors from sources, such as client side computers or servers, or other resources in the field who have recently encountered the software, and determined it to be suspect, but no determination was made as to whether the file is malware or goodware.

As seen in FIG. 1, the one or more signature generator modules 110 may include an attribute collection module 112, a heuristic module 114, a clustering module 116, a cluster validation module 118, a signature creation module 120, and a deployment module 122.

The attribute collection module 112 processes the software in the malware dataset 152 and goodware dataset 154 looking for physical static attributes associated with the software to build a corpus of static attributes. To represent each static attribute in a suitable form for automatic processing, the attribute collection module assigns each attribute a comparison value. It should be noted, that when clustered, which is described below, an entire cluster of software (or files) can have a numerical value range having "min" and "max" values. The collected attribute data is stored in intermediate data set 162 within the data storage module 150, and is used by the heuristic module 114 as a training set to build a heuristic model, and used by the clustering module 116 to mine for patterns and build clusters. A static attribute for software is one or more characteristics of the software that can be ascertained without the need to observe the software during execution. Examples of static attributes include; file size, code size, entropy of file, string characteristics, size of appended data, the section where the software is located within a larger program, and the number of sections in the software. However, the number of static attributes is extensive and this list is in no way intended to limit the static attributes that can be ascertained from software and used with the system of the present application.

The heuristic module 114 uses the collected static attribute data from the intermediate data set 162 as a training set to build a heuristics model that is used to identify patterns in the attribute data for clustering. The heuristic model may use decision trees, or other techniques that enable an inference to be drawn as to whether software includes or is malware. Preferably, the heuristic model is a forest of decision trees. Building a forest of decision trees is generally known in the art. However, unlike conventional decision tree forests, the forest of decision trees built in accordance with the present disclosure uses all the collected static attribute data to train the forest of decision trees. Using all collected static attribute data to train the forest of decision trees and specifying that there is no smallest allowable node size is sometimes referred to as over-training the decision tree. Each terminal node in the forest of decision trees is then assigned a number, which are assigned in sequence, between 1 and "N" terminal nodes, where "N" is dependent upon the total number of terminal nodes within the decision tree or forest.

The clustering module 116 runs the goodware and unknown files from datasets 154 and 156 through the heuristic model, which in the example provided is a forest of decision trees, to identify patterns and then organize the patterns so that similar attributes are clustered together. More specifically, each file in the goodware and unknown file datasets 154 and 156 is run through the forest of decision trees and the output for the particular file of software is a number sequence in the form of a pattern of "n" unique numbers, where "n" is the number of trees in the forest. This process is repeated for each file in the goodware and unknown files from datasets 154 and 156. The clustering module 116 then compares each pattern of "n" unique numbers and groups and clusters those that have identical terminal node patterns.

It should be noted that as the collected static attributes are from both the malware dataset 152 and the goodware dataset 154, a resulting cluster can consist of attributes of a single class (e.g., all malware), or can contain a mix of both classes.

Also, number patterns (or sequences) from different instances of a polymorphic malware family tend to cluster together because the attributes of the malware stay consistent despite the polymorphisms. A cluster that contains attributes predominantly indicative of being from known malware (called a "bad cluster") are presumed to describe behaviors of a single malware family, e.g., a set of malware that are related through polymorphisms, a common code base, or another relationship. Similarly, a cluster that contains attributes predominantly indicative of having bad characteristics but not known to be malware (called a "suspected bad cluster") are presumed to describe behaviors that are more likely than not of a single malware family. A cluster that contains attributes predominantly indicative of being from goodware (called a "good cluster") are presumed to describe behaviors of a single goodware family. Similarly, a cluster that contains attributes predominantly indicative of having good characteristics but not known to be goodware (called a "suspected good cluster") are presumed to describe behaviors that are more likely than not of a single goodware family. By treating the clusters in this fashion, it is possible to reduce the number of false positives because software that falls within a good cluster and software that falls within a suspected good cluster can be treated the same by anti-virus software, i.e., they will not prevent the software from getting into a protected system.

The cluster validation module 118 analyzes the clusters to validate the quality of each cluster. To validate each cluster, each file in the cluster is assessed for its reputation utilizing an existing classification system. Then the cluster is assessed for purity by looking at the reputations of each file in the cluster.

For each bad cluster and each suspected bad cluster, the signature creation module 120 then creates a unique signature that can be used to detect malware associated with that cluster. To create the unique signature for a cluster, the signature creation module 120 conducts a look back or walk back evaluation of each terminal node to find all static attributes involved in making decisions in the forest of decision trees. The signature creation module 120 then takes the attribute comparison values for all such static attributes in the bad cluster or suspected bad cluster and generates a string in the form of a single complex Boolean expression representing a unique signature for the cluster. This Boolean expression may include inequality strings, such as less than (<) or greater than (>) strings, exact match strings, and set inclusion strings, such as a value is in the set of {a, b, c}. For example, if the forest of decision trees had five decision trees (trees 1-5), where tree 1 had static attribute "a1", tree 2 had static attribute "a2", tree 3 had static attribute "a3", tree 4 had static attribute "a4", and tree 5 had static attribute "a5", and if it were determined that the attribute comparison values for static attribute "a1" were between 90 and 100, the attribute comparison values for static attribute "a2" were between 48 and 52, the attribute comparison value for static attribute "a3" was equal to 1000, the attribute comparison value for static attribute "a4" was greater than 150, and the attribute comparison value for static attribute "a5" was in the set of {French, English, German}, the single Boolean expression would be: if a1>=90 && a1<=100 && a2>=48 && a2<=52 && a3==1000 && a4>150 && a5 E {French, English, German}.

Figure 2:
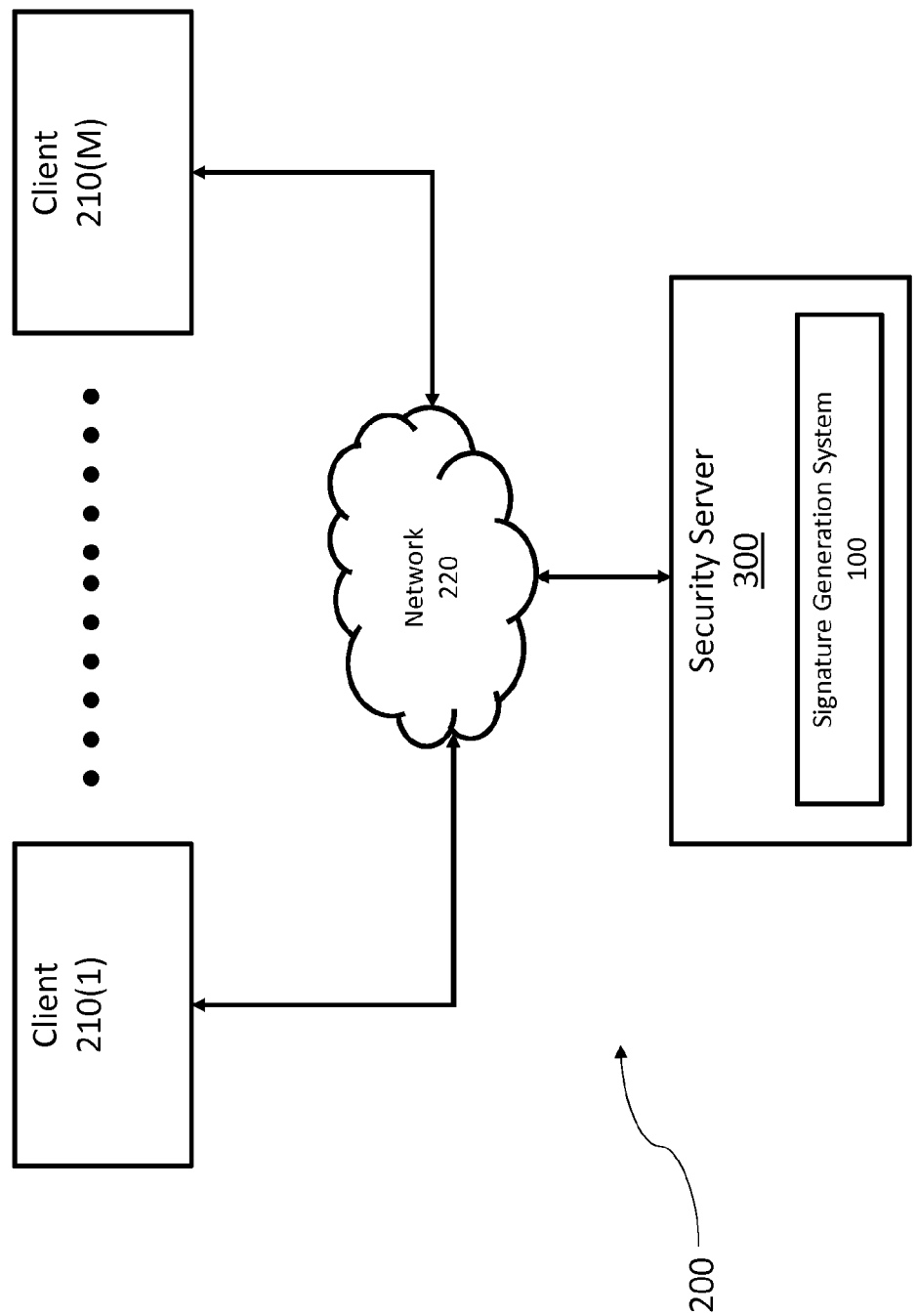
FIG. 2 is a block diagram of an exemplary computing system implementing a security server incorporating the signature generation system of FIG. 1.

The deployment module 122 is programmed to deploy the unique signatures within a community or enterprise. As seen in FIG. 2, the signature generation system 100 may be deployed in security server 300, which is connected to remote computing systems, e.g., clients 210(1)-210(M) via network 220. In such a configuration, the deployment module would be configured to transmit or deploy the signatures generated by the system 100 to the clients.

Using the above system and process, unique signatures for each bad cluster and suspected bad cluster are generated and deployed to the field. On regular intervals, e.g. once a day, new malware may be moved from the new malware dataset may be classified and moved to the historical malware dataset, and new malware dataset is loaded with new unclassified malware. At this point, the system according to the present disclosure may be initiated to repeat the process of generating new signatures for bad and suspected bad clusters.

Although the signature generator modules 110 are described above and illustrated as separate elements, one or more of modules 110 (seen in FIG. 1) may represent portions of a single module or application. In certain embodiments, one or more of signature generator modules 110 may represent one or more software applications or programs that, when executed by a computing device, may cause the computing device to perform one or more tasks. For example, one or more of modules 110 may represent software modules stored and configured to run on one or more computing devices, such as the security server 300 illustrated in FIGS. 2 and 3, and/or portions of exemplary network architecture 400 in FIG. 4. One or more of modules 110 in FIG. 1 may also represent all or portions of one or more special-purpose computers configured to perform one or more tasks.

Further, the exemplary signature generation system 100 of FIG. 1 may be deployed in a variety of ways. For example, all or a portion of the system 100 may represent portions of a cloud-computing or network-based environment, such as exemplary system 200 illustrated in FIG. 2. In this exemplary environment, malware signatures are generated by the signature generation system 100, and deployed to remote computing systems via the cloud computing or networked-based environment.

Figure 3:
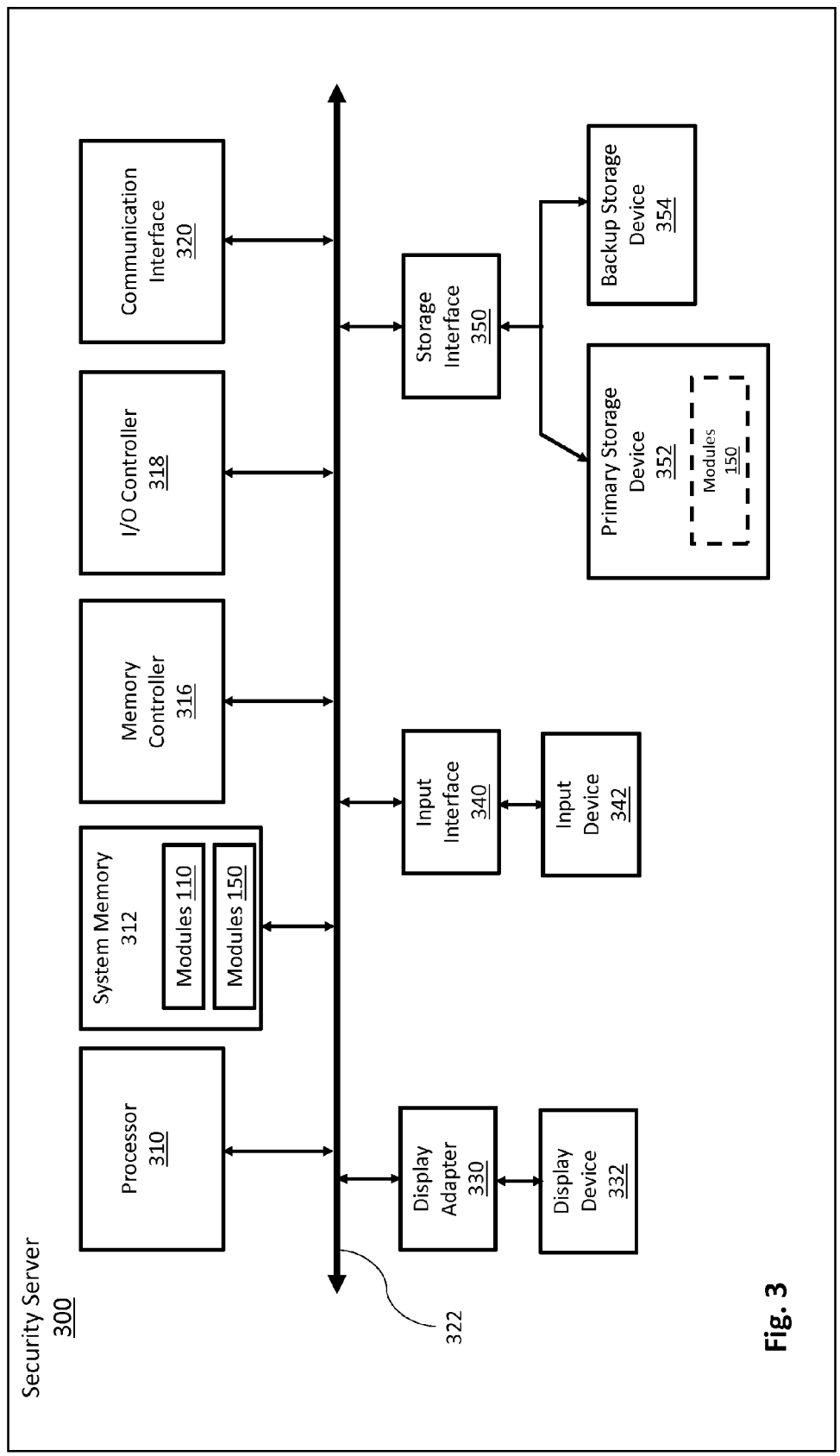
FIG. 3 is a block diagram of an exemplary embodiment of the security server of FIG. 2.

FIG. 3 is a block diagram of an exemplary security server 300 capable of implementing one or more of the embodiments described and/or illustrated herein. Security server 300 broadly represents any single or multi-processor computing device or system capable of executing computer-readable instructions. Examples of security server 300 include, without limitation, workstations, laptops, client-side terminals, servers, distributed computing systems, handheld devices, or any other computing system or device. In its most basic configuration, the security server 300 may include at least one processor 310, and system memory 312.

Processor 310 generally represents any type or form of processing unit capable of processing data or interpreting and executing instructions. In certain embodiments, processor 310 may receive instructions from a software application or module. These instructions may cause processor 310 to perform the functions of one or more of the exemplary embodiments described and/or illustrated herein. For example, processor 310 may perform and/or be a means for performing, either alone or in combination with other elements, one or more of the functions described above for the modules 110, including the attribute collection, heuristic modeling, clustering, cluster validation, signature creation and deploying functions. Processor 310 may also perform and/or be a means for performing any other steps, methods, or processes described and/or illustrated herein.

System memory 312 generally represents any type or form of volatile or non-volatile storage device or medium capable of storing data and/or other computer-readable instructions. Examples of system memory 312 include, without limitation, random access memory (RAM), read only memory (ROM), flash memory, or any other suitable memory device. Although not required, in certain embodiments security server 300 may include both a volatile memory unit (such as, for example, system memory 312) and a non-volatile storage device (such as, for example, primary storage device 352, as described in detail below). In one example, one or more of modules 110 and 150 from FIG. 1 may be loaded into system memory 312. In another example, one or more of modules 110 from FIG. 1 may be loaded into system memory 312, and the data storage modules 150 from FIG. 1 may be loaded into primary storage device 352, as shown by dotted lines in FIG. 3.

In certain embodiments, exemplary security server 300 may also include one or more components or elements in addition to processor 310 and system memory 312. For example, as illustrated in FIG. 3, security server 300 may include a memory controller 316, an Input/Output (I/O) controller 318, and a communication interface 320, each of which may be interconnected via a communication infrastructure 322. Communication infrastructure 322 can be any type or form of infrastructure capable of facilitating communication between one or more components of a computing device. Examples of communication infrastructure 322 include, without limitation, a communication bus (such as an ISA, PCI, PCIe, or similar bus) and a network.

Memory controller 316 can be any type or form of device capable of handling memory or data or controlling communication between one or more components of security server 300. For example, in certain embodiments memory controller 316 may control communication between processor 310, system memory 312, and I/O controller 318 via communication infrastructure 322. Memory controller 316 may perform and/or be a means for performing, either alone or in combination with other elements, one or more of the steps, features or functions described and/or illustrated herein, including the attribute collection, heuristic modeling, clustering, cluster validation, signature creation and deploying functions.

I/O controller 318 can be any type or form of device capable of coordinating and/or controlling the input and output functions of a computing device. For example, I/O controller 318 may control or facilitate transfer of data between one or more elements of security server 300, such as processor 310, system memory 312, communication interface 320, display adapter 330, input interface 340, and storage interface 350. I/O controller 318 may be used, for example, to perform and/or be a means for performing, either alone or in combination with other elements, one or more of the steps, features or functions described and/or illustrated herein, including the attribute collection, heuristic modeling, clustering, cluster validation, signature creation and deploying functions. I/O controller 318 may also be used to perform and/or be a means for performing other steps and features set forth in the instant disclosure.

Communication interface 320 can be any type or form of communication device or adapter capable of facilitating communication between exemplary security server 300 and one or more additional devices. For example, communication interface 320 may facilitate communication between security server 300 and a private or public network including additional computing systems. Examples of communication interface 320 include, without limitation, a wired network interface (such as a network interface card), a wireless network interface (such as a wireless network interface card), and/or a modem. In at least one embodiment, communication interface 320 provides a direct connection to a remote computing system (e.g., a client computing device or a server) via a direct link to a network, such as the Internet. Communication interface 320 can also be configured to indirectly provide such a connection through, for example, a local area network (such as an Ethernet network), a personal area network, a telephone or cable network, a cellular telephone connection, a satellite data connection, or any other suitable connection.

The communication interface 320 can also function as a host adapter configured to facilitate communication between security server 300 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 320 may also allow the security server 300 to engage in distributed or remote computing. For example, communication interface 320 can receive instructions from a remote device or send instructions to a remote device for execution. In certain embodiments, communication interface 320 may perform and/or be a means for performing, either alone or in combination with other elements, one or more of the steps, features or functions described and/or illustrated herein, including the attribute collection, heuristic modeling, clustering, cluster validation, signature creation and deploying functions. Communication interface 320 may also be used to perform and/or be a means for performing other steps, features and/or functions set forth in the instant disclosure.

Continuing to refer to FIG. 3, security server 300 may also include at least one display device 332 coupled to communication infrastructure 322 via a display adapter 330. Display device 332 can be any type or form of device capable of visually displaying information forwarded by display adapter 330. Similarly, display adapter 330 can be any type or form of device configured to forward graphics, text, and other data from communication infrastructure 322 (or from a frame buffer, as known in the art) for display on display device 332.

The security server 300 may also include at least one input device 342 coupled to communication infrastructure 322 via an input interface 340. Input device 342 can be any type or form of input device capable of providing input, either computer or human generated, to the computing system 300. Examples of input device 342 include, without limitation, a keyboard, a pointing device, a speech recognition device, or any other input device. In at least one embodiment, input device 342 may perform and/or be a means for performing, either alone or in combination with other elements, one or more of the steps, features or functions described and/or illustrated herein, including the attribute collection, heuristic modeling, clustering, cluster validation, signature creation and deploying functions. Input device 342 may also be used to perform and/or be a means for performing other steps, features and/or functions set forth in the instant disclosure.

As noted above, the security server 300 may also include a primary storage device 352 and a backup storage device 354 coupled to communication infrastructure 322 via a storage interface 350. Storage devices 352 and 354 can be any type or form of storage device or medium capable of storing data and/or other computer-readable instructions. For example, the storage devices 352 and 354 may be a magnetic disk drive, a floppy disk drive, a magnetic tape drive, an optical disk drive, a flash drive, or the like. Storage interface 350 can be any type or form of interface or device for transferring data between storage devices 352 and 354 and other components of security server 300. In one example, the data storage modules 150 from FIG. 1 may be stored in primary storage device 352.

In certain embodiments, storage devices 352 and 354 may be configured to read from and/or write to a removable storage unit configured to store computer software, data, or other computer-readable information. Examples of suitable removable storage units include a floppy disk, a magnetic tape, an optical disk, a flash memory device, or the like. Storage devices 352 and 354 may also include other similar structures or devices for allowing computer software, data, or other computer-readable instructions to be loaded into security server 300. For example, storage devices 352 and 354 may be configured to read and write software, data, or other computer-readable information. Storage devices 352 and 354 may also be a part of the security server 300 or may be a separate device accessed through other interface systems.

In certain embodiments, storage devices 352 and 354 may be used, for example, to perform and/or be a means for performing, either alone or in combination with other elements, one or more of the steps, features or functions described and/or illustrated herein, including the attribute collection, heuristic modeling, clustering, cluster validation, signature creation and deploying functions. Storage devices 352 and 354 may also be used to perform and/or be a means for performing other steps, features and/or functions set forth in the instant disclosure.

Many other devices or subsystems may be connected to security server 300. Conversely, all of the components and devices illustrated in FIG. 3 need not be present to practice the system 100 of the present disclosure. Security server 300 may also employ any number of software, firmware, and/or hardware configurations. For example, one or more of the exemplary embodiments of the system 100 may be encoded as a computer program (also referred to as computer software, software applications, computer-readable instructions, or computer control logic) on a computer-readable medium.

The computer-readable medium containing the computer program may be loaded into security server 300. All or a portion of the computer program stored on the computer-readable medium may then be stored in system memory 312 and/or various portions of storage devices 352 and 354. When executed by processor 310, a computer program loaded into security server 300 may cause processor 310 to perform and/or be a means for performing the functions of one or more of the exemplary embodiments described and/or illustrated herein. Additionally or alternatively, one or more of the exemplary embodiments described and/or illustrated herein may be implemented in firmware and/or hardware.

Figure 4:
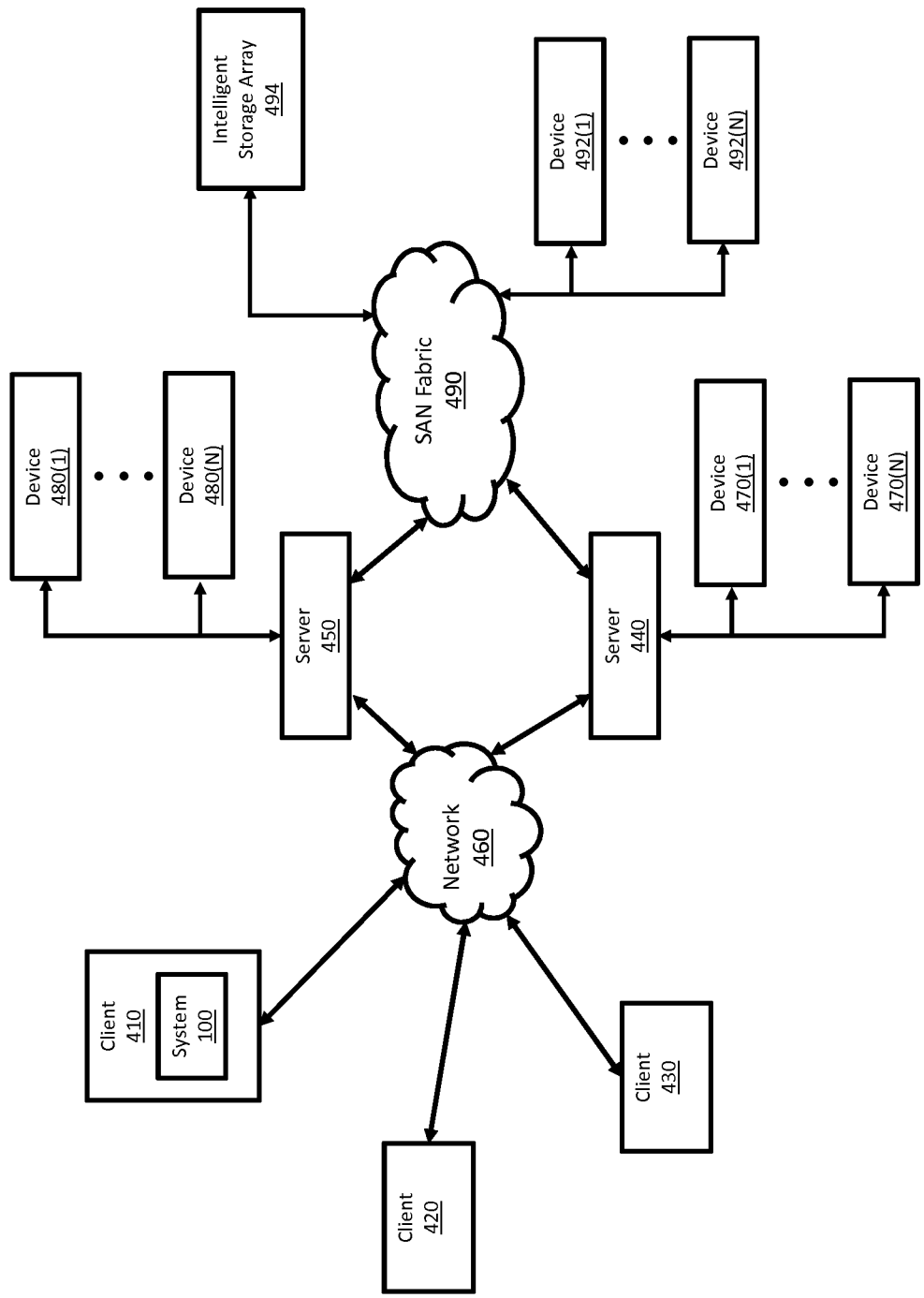
FIG. 4 is a block diagram of a network secured by the signature generation system of FIG. 1.

As noted above, the signatures generated by the system 100 may be deployed to remote computing systems. FIG. 4 is a block diagram of an exemplary network architecture 400 in which client systems 410, 420, and 430 and servers 440 and 450 may be coupled to a network 460. In the exemplary embodiment of FIG. 4, the system 100 of the present disclosure is loaded into client system 410. However, the system 100 of the present disclosure may be loaded into any client system or server connected to the network 460. Client systems 410, 420, and 430 can be any type or form of computing device or system, such as exemplary security server 300 in FIG. 3. Similarly, servers 440 and 450 can be computing devices or systems, such as application servers or database servers, configured to provide various database services and/or run certain software applications. Network 460 can be any telecommunication or computer network including, for example, an intranet, a wide area network (WAN), a local area network (LAN), a personal area network (PAN), or the Internet.

As illustrated in FIG. 4, one or more storage devices 470(1)-(N) may be directly attached to server 440. Similarly, one or more storage devices 480(1)-(N) may be directly attached to server 450. Storage devices 470(1)-(N) and storage devices 480(1)-(N) can be any type or form of storage device or medium capable of storing data and/or other computer-readable instructions. In certain embodiments, storage devices 470(1)-(N) and storage devices 480 (1)-(N) may represent network-attached storage (NAS) devices configured to communicate with servers 440 and 450 using various protocols, such as NFS, SMB, or CIFS.

Servers 440 and 450 may also be connected to a storage area network (SAN) fabric 490. SAN fabric 490 can be any type or form of computer network or architecture capable of facilitating communication between a plurality of storage devices. SAN fabric 490 may facilitate communication between servers 440 and 450 and a plurality of storage devices 492(1)-(N) and/or an intelligent storage array 494. SAN fabric 490 may also facilitate, via network 460 and servers 440 and 450, communication between client systems 410, 420, and 430 and storage devices 492(1)-(N) and/or intelligent storage array 494 in such a manner that devices 492(1)-(N) and array 494 appear as locally attached devices to client systems 410, 420, and 430. As with storage devices 470(1)-(N) and storage devices 480(1)-(N), storage devices 492(1)-(N) and intelligent storage array 494 generally represent any type or form of storage device or medium capable of storing data and/or other computer-readable instructions.

In certain embodiments, and with reference to the exemplary security server 300 of FIG. 3, a communication interface, such as communication interface 320 (seen in FIG. 3), may be used to provide connectivity between each client system 410, 420, and 430 and network 460. Client systems 410, 420, and 430 may be able to access information on server 440 or 450 using, for example, a web browser or other client software. Such software may allow client systems 410, 420, and 430 to access data hosted by server 440, server 450, storage devices 470(1)-(N), storage devices 480(1)-(N), storage devices 492(1)-(N), or intelligent storage array 494.

Figure 5:
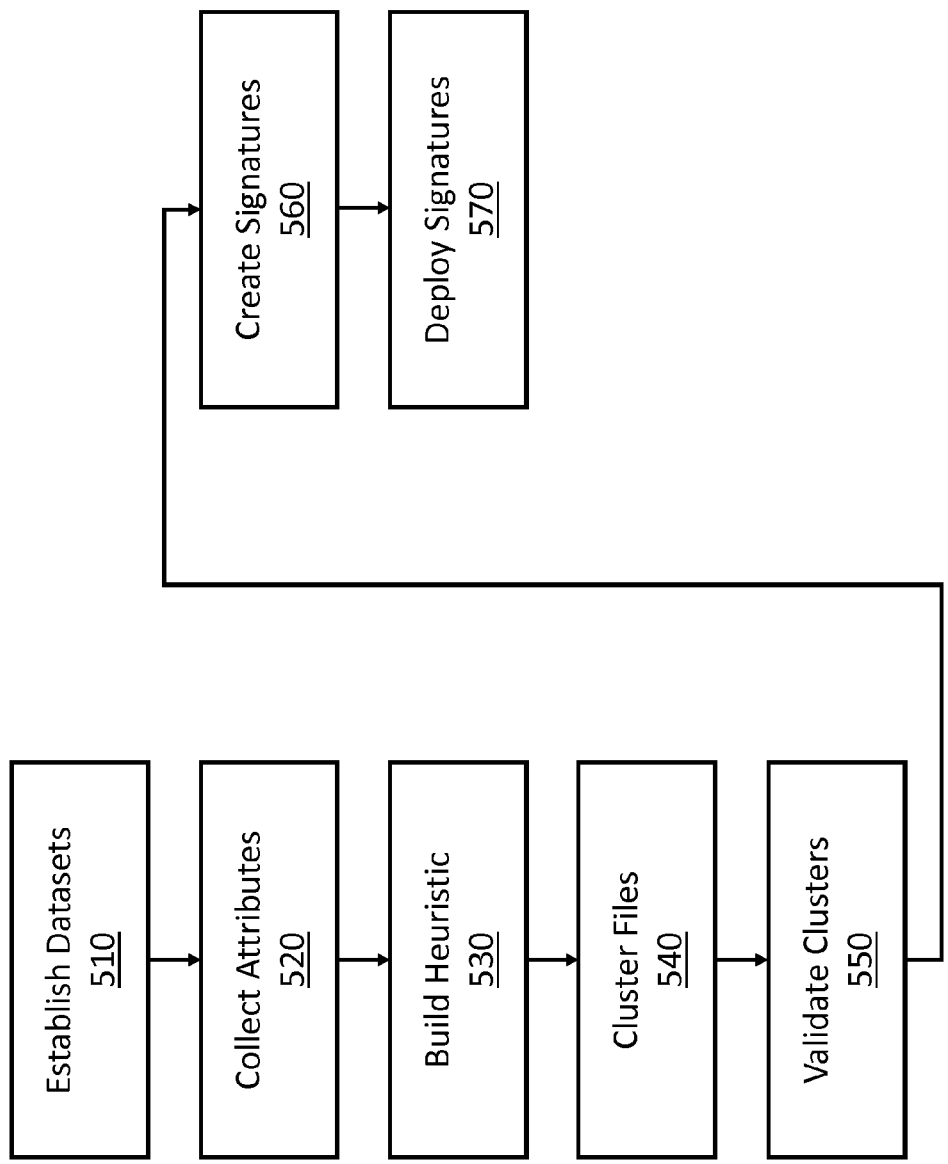
FIG. 5 is a flow diagram illustrating steps performed by the signature generation system for automatically generating signatures to detect malware.

Referring now to FIG. 5, an exemplary flow diagram of the steps performed by one embodiment of the system 100 is disclosed. Initially, at step 510, one or more datasets are established. Preferably, the datasets include the malware dataset 152, the goodware dataset 154, and the unknown file dataset 156. At step 520, the security server 300 executes the attribute collection module to collect attributes from the malware dataset 152 and goodware dataset 154. At step 530, using the collected attribute data, the security server 300 initiates the heuristic module 114 to build a heuristic model that is used to identify patterns in the attribute data for clustering. At step 540, the security server 300 executes the clustering module 116 to run goodware and unknown files from datasets 154 and 156 through the heuristic model to identify patterns and then organize the patterns so that files with similar attributes are clustered together. At step 550, the security server 300 executes the clustering validation module 116 to validate the clusters against reputation values, as described above. At step 560, clusters determined to be bad or suspected bad clusters are processed by the security server 300 executing the signature creation module 120 to create a signature representative of the bad or suspected bad cluster, as described above. At step 570, once signatures are created for all bad and suspected bad clusters they are deployed by security server 300 executing the deployment module 122.

While the foregoing disclosure sets forth various embodiments using specific block diagrams, flow diagrams, and examples, each block diagram component, flow diagram step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

Process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

What is claimed is:

1. A method for automatically generating signatures for detecting malware, comprising:
   collecting a set of static attributes from a malware dataset and a goodware dataset;
   generating a plurality of decision trees from the set of static attributes, wherein each decision tree in the plurality of decision trees comprises a plurality of terminal nodes;
   identifying, for each sample in a known-file dataset, a pattern of terminal nodes to which the sample is mapped by the plurality of decision trees, wherein the pattern of terminal nodes of the sample comprises a representation of a terminal node from each decision tree within the plurality of decision trees to which the sample has been mapped;
   generating a cluster of samples comprising samples in the known file dataset that have identical patterns of terminal nodes;
   validating the cluster of samples against a reputation value range to determine a purity of the cluster of samples; and
   generating, based at least in part on the purity of the cluster of samples, a signature for identifying additional files that are similar to the samples in the cluster of samples.

2. The method for automatically generating signatures for detecting malware according to claim 1, further comprising:
   detecting a malicious file that satisfies the signature; and
   performing, in response to detecting the malicious file, a security action on the malicious file.

3. The method for automatically generating signatures for detecting malware according to claim 1, wherein generating the plurality of decision trees from the set of static attributes comprises over-training the plurality of decision trees without restricting the smallest allowable size of nodes within the plurality of decision trees.

4. The method for automatically generating signatures for detecting malware according to claim 1, wherein:
   the known file dataset comprises a plurality of files known to be malicious;
   validating the cluster of samples against the reputation value range to determine the purity of the cluster of samples comprises determining that the cluster of samples is a bad cluster.

5. The method for automatically generating signatures for detecting malware according to claim 1, wherein:
   the known file dataset comprises a plurality of files known to be benign;
   validating the cluster of samples against the reputation value range to determine the purity of the cluster of samples comprises determining that the cluster of samples is a good cluster.

6. The method for automatically generating signatures for detecting malware according to claim 1, wherein:
   the known file dataset comprises a plurality of files known to be malicious;
   validating the cluster of samples against the reputation value range to determine the purity of the cluster of samples comprises determining that the cluster of samples is a suspected bad cluster.

7. The method for automatically generating signatures for detecting malware according to claim 1, wherein:
   the known file dataset comprises a plurality of files known to be benign;
   validating the cluster of samples against the reputation value range to determine the purity of the cluster of samples comprises determining that the cluster of samples is a suspected good cluster.

8. A system to automatically generate signatures used to detect malware, comprising:
   an attribute collection module, stored in memory, that collects a set of static attributes from a malware dataset and a goodware dataset;
   a heuristic module, stored in memory, that generates a plurality of decision trees from the set of static attributes, wherein each decision tree in the plurality of decision trees comprises a plurality of terminal nodes;
   a clustering module, stored in memory, that:
      identifies, for each sample in a known-file dataset, a pattern of terminal nodes to which the sample is mapped by the plurality of decision trees, wherein the pattern of terminal nodes of the sample comprises a representation of a terminal node from each decision tree within the plurality of decision trees to which the sample has been mapped; and
      generates a cluster of samples comprising samples in the known file dataset that have identical patterns of terminal nodes;
   a cluster validation module, stored in memory, that validates the cluster of samples against a reputation value range to determine a purity of the cluster of samples;

a signature creation module, stored in memory, that creates, based at least in part on the purity of the cluster of samples, a signature for identifying additional files that are similar to the samples in the cluster of samples; and at least one physical processor that executes the attribute collection module, the heuristic module, the clustering module, the cluster validation module, and the signature creation module.

9. The system according to claim 8, further comprising a security module that:
   detects a malicious file that satisfies the signature; and
   performs, in response to detecting the malicious file, a security action on the malicious file.

10. The system according to claim 8, wherein the heuristic module generates the plurality of decision trees from the set of static attributes by over-training the plurality of decision trees without restricting the smallest allowable size of nodes within the plurality of decision trees.

11. The system according to claim 8, wherein:
   the known file dataset comprises a plurality of files known to be malicious;
   the cluster validation module validates the cluster of samples against the reputation value range to determine the purity of the cluster of samples by determining that the cluster of samples is a bad cluster.

12. The system according to claim 8, wherein:
   the known file dataset comprises a plurality of files known to be benign;
   the cluster validation module validates the cluster of samples against the reputation value range to determine the purity of the cluster of samples by determining that the cluster of samples is a good cluster.

13. The system according to claim 8, wherein:
   the known file dataset comprises a plurality of files known to be malicious;
   the cluster validation module validates the cluster of samples against the reputation value range to determine the purity of the cluster of samples by determining that the cluster of samples is a suspected bad cluster.

14. The system according to claim 8, wherein:
   the known file dataset comprises a plurality of files known to be benign;
   the cluster validation module validates the cluster of samples against the reputation value range to determine the purity of the cluster of samples by determining that the cluster of samples is a suspected good cluster.

15. A non-transitory computer-readable medium comprising computer executable instructions that when executed by at least one processor of a computing device, cause the computing device to:
   collect a set of static attributes from a malware dataset and a goodware dataset;
   generate a plurality of decision trees from the set of static attributes, wherein each decision tree in the plurality of decision trees comprises a plurality of terminal nodes;
   identify, for each sample in a known-file dataset, a pattern of terminal nodes to which the sample is mapped by the plurality of decision trees, wherein the patter of terminal nodes of the sample comprises a representation of a terminal node from each decision tree within the plurality of decision trees to which the sample has been mapped;
   generate a cluster of samples comprising samples in the known file dataset that have identical patterns of terminal nodes;
   validate the cluster of samples against a reputation value range to determine a purity of the cluster of samples; and
   generate, based at least in part on the purity of the cluster of samples, a signature for identifying additional files that are similar to the samples in the cluster of samples.

16. The computer-readable medium according to claim 15, further comprising computer executable instructions that when executed by at least one processor of a computing device, cause the computing device to:
   detect a malicious file that satisfies the signature; and
   perform, in response to detecting the malicious file, a security action on the malicious file.

17. The computer-readable medium according to claim 15, wherein the computer executable instructions cause the computing device to generate the plurality of decision trees from the set of static attributes by causing the computing device to over-train the plurality of decision trees without restricting the smallest allowable size of nodes within the plurality of decision trees.

18. The computer-readable medium according to claim 15, wherein:
   the known file dataset comprises a plurality of files known to be malicious;
   the computer executable instructions cause the computing device to validate the cluster of samples against the reputation value range to determine the purity of the cluster of samples by causing the computing device to determine that the cluster of samples is a bad cluster.

19. The computer-readable medium according to claim 15, wherein:
   the known file dataset comprises a plurality of files known to be benign;
   the computer executable instructions cause the computing device to validate the cluster of samples against the reputation value range to determine the purity of the cluster of samples by causing the computing device to determine that the cluster of samples is a good cluster.

20. The computer-readable medium according to claim 15, wherein:
   the known file dataset comprises a plurality of files known to be malicious;
   the computer executable instructions cause the computing device to validate the cluster of samples against the reputation value range to determine the purity of the cluster of samples by causing the computing device to determine that the cluster of samples is a suspected bad cluster.

* * * * *